May 28, 1968
O. O. SCHAUS
3,385,528
PROCESS AND APPARATUS FOR WET MILLING MALT
Filed Sept. 23, 1965
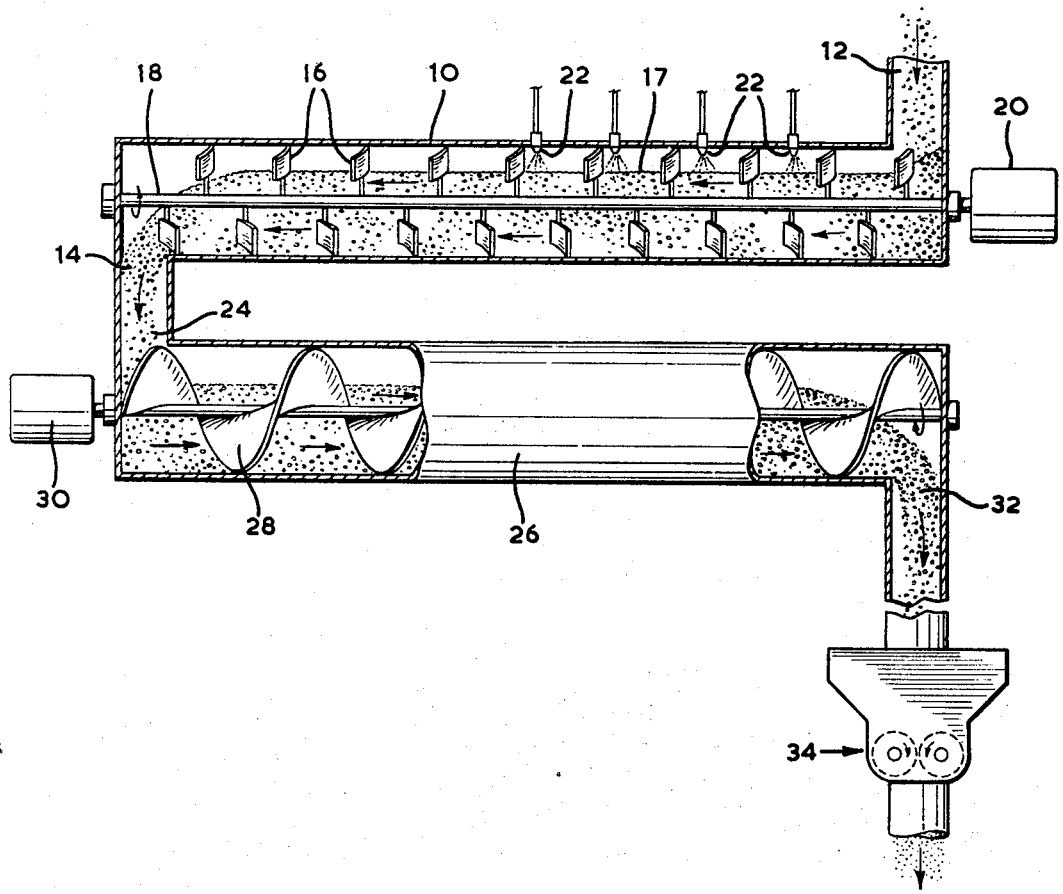
INVENTOR.
ORLAND O. SCHAUS
BY *Fetherstonhaugh & Co.*
ATTORNEYS United States Patent Office 3,385,528
Patented May 28, 1968

3,385,528
PROCESS AND APPARATUS FOR WET
MILLING MALT
Orland O. Schaus, Don Mills, Ontario, Canada, assignor to Canadian Breweries Limited, Toronto, Ontario, Canada
Filed Sept. 23, 1965, Ser. No. 489,685
6 Claims. (Cl. 241—15)

ABSTRACT OF THE DISCLOSURE

The invention relates to a method and apparatus for wetting malt prior to milling and involves the continuous mixing of a quantity of malt as it is propelled along a path so that moisture can be added to it as it is propelled along the path. To achieve a uniform wetting, the amount of moisture added is predetermined and the continuous mixing aciheves a uniformity of water throughout the whole quantity of malt. Provision is made for holding the malt after it has been uniformly wetted to permit uniform diffusion of the moisture into the holes.

---

This invention relates to a method and to an apparatus for wet milling malt to be used in the production of alcoholic brewery beverages.

In the use of malt in the manufacture of brewery beverages, the malt is ground into a flour in a malt grinding mill. It is well known that one gets a better yield of malt extract by fine grinding the malt kernels, but if the grind is too fine, the dry malt hulls tend to shatter into small pieces. The hulls form the filter bed during the subsequent lautering operation in the brewing process, and if they are too finely broken, the filtering operation becomes too slow to be practical. There is thus a limit upon the fineness of the grind that is permitted in the milling of malt with a view to getting an increased yield from the kernel that is imposed by the resulting finely shattered hulls that tend to slow down the lautering operation if the grind is too fine.

These considerations have been recognized for many years and a process for the wet milling of malt has been devised and used for some years. With this process the malt is wetted with water to increase its weight by between 10 to 30%, with the result that water permeates the dry hulls and the wetted hulls become softer and less friable and do not tend to shatter when the malt is finely ground. Thus, one is permitted to grind the malt more finely and obtain a better yield of the malt extract without unduly increasing the fineness of the hulls due to shattering and impairing the filtering operation in the lauter tun. In fact, by wet milling it is possible to increase the yield of the extract and at the same time reduce the run-off time from the lauter tun in the brewing process.

The process as practiced prior to this invention consisted essentially of placing the malt in a large bin and flooding the bin with water for about fifteen minutes. After drainage the malt is passed through a two roll malt mill and used in the brewing operation according to standard practice.

The wetting of malt according to prior practice has several disadvantages. In the first place it is a batch process, and as such requires intermittent operation of the milling equipment. It is difficult to control the amount of moisture added to the malt by the flooding method. It requires large bins and special plant not suitable for many malting mills. The product is not uniform because of difficulties in moisture control.

It is therefore an object of this invention to provide a method and apparatus for wetting malt prior to milling that can be operated on a continuous basis.

It is a further object of this invention to provide a method and apparatus for wetting malt for milling with which it is possible to accurately control the amount of moisture added to the malt and with which it is possible to accurately control the residence time of the malt in the equipment.

It is a further object of the invention to provide a method and apparatus for wetting malt prior to milling that can be practiced and/or used in a small amount of space.

It is a still further object of this invention to provide a method and apparatus for wetting malt prior to milling with which it is possible to achieve a uniform product.

With these and other objects in view, the method of wetting malt for milling according to this invention comprises the steps of continuously feeding dry malt to the beginning of a wetting path, continuously mixing and propelling the malt along the wetting path to the end thereof, applying water to the malt as it is propelled along the path, continuously conducting malt from the end of the wetting path to the beginning of a holding path, continuously propelling the malt along the holding path to the end thereof and conducting malt from the end of the holding path to a malt mill, the extent of the holding path being of such a length as to permit the water to uniformly diffuse into the hulls of the malt, the amount of water applied to the malt being adapted to avoid shattering in the mill.

The apparatus according to the invention consists essentially of a wetting chamber that defines therein a wetting path for malt, a malt inlet to the wetting chamber adjacent the beginning of the wetting path, a malt outlet from the wetting chamber adjacent the end of the wetting path, means for continuously propelling malt admitted to the wetting chamber along the wetting path, means for admitting a predetermined amount of moisture to the wetting chamber to wet malt as it moves along the wetting path, a holding chamber having an inlet communicating with said outlet of the wetting chamber, said holding chamber having an outlet, said holding chamber defining a holding path and time between its said inlet and outlet, and means for continuously propelling malt along said holding path at a predetermined rate whereby malt travels said holding path in a predetermined time. The invention will be clearly understood after reference to the following detailed specification read in conjunction with the drawings.

In the drawings:

The figure generally refers to apparatus according to the invention.

Referring to the drawings, the apparatus there shown consists of a wetting chamber 10 that is round in cross section and that has an inlet 12 and an outlet 14 which are adapted to continuously receive and discharge malt respectively. Malt admitted to the inlet 12 is propelled along the wetting path between the inlet 12 and the outlet 14 by means of the curved paddles 16 that are mounted on the rotatably mounted shaft 18, which in turn is driven by the driving motor 20. Propelling paddles 16 additionally mix the malt as they propel it along the wetting path to ensure uniform wetting. The malt level in the apparatus is indicated by the numeral 17.

Water is admitted to the wetting chamber to the malt as it travels along the wetting path by means of nozzles 22 in the top of the wetting chamber.

Malt is discharged through the malt outlet 14 of the wetting chamber which communicates with the inlet 24 of a holding chamber 26. Holding chamber 26 has a screw conveyor 28 that is rotatably mounted in the ends thereof and driven by means of a motor 30 to carry malt along a holding path that extends from the inlet 24 to the outlet 32. The speed of the drive motor 30 is adjusted so that the malt that continuously travels through the holding chamber is held therein long enough to permit the uniform diffusion of the moisture added to the malt in the wetting chamber into the husks, it being recalled that the purpose of the method and apparatus is to wet the malt and soften the husks so that they will not shatter when the kernel is ground finely with a view to achieving a good yield of extract.

The malt so wetted is directed from the outlet 32 of the holding chamber 26 to a two roll malt mill, generally indicated by the numeral 34.

As indicated above, the general considerations concerning the wetting of malt prior to milling are well known. It is known that by adding between 10 to 30% moisture by weight to the malt prior to milling, one can get a better yield of malt extract and a better filtering action. This is because the hulls have been wetted and thereby softened and do not shatter unduly as the malt is ground more finely for the purpose of getting a better yield of extract from the kernels. The considerations of fineness of grinding to get optimum yield of extract with acceptable shattering of hulls in moistened malt are well known and not dealt with exhaustively in this patent.

Following is an example of the use of this invention:

Apparatus similar to that illustrated in the drawings was constructed. The wetting chamber had a diameter of about twenty inches and a length of about thirty feet. The holding chamber had a diameter of about thirty inches and a length of about thirty-five feet. Dry malt having a moisture content of about four percent by weight was fed into the inlet 12 at a rate of about 8,000 pounds per hour. It was continuously moved along the wetting path by rotation of the paddles 16 and continuously mixed as it was so moved by the paddles 16. As it passed through the wetting path, water was sprayed onto it through the nozzles 22 to bring the moisture content thereof up to 20% on a dry basis level.

The malt was conducted from the outlet 14 of the wetting chamber through the inlet 24 to the holding chamber, where it was moved along the holding path by means of the screw conveyor 28 in a period of about fifteen minutes, during which time the added moisture diffused into the hulls of the malt. At the end of the holding path of the holding chamber it was discharged through the outlet 32 to the cooperating rollers 34 of a roll mill. The rollers had a spacing of seventeen one-thousandths of an inch. The resulting flour gave an increased yield of 1.5% of malt extract and a reduction in lauter tun runoff time of 15% when used in the brewing process over and above dry malt ground to best advantage.

What I claim as my invention is:

1. A method of wetting malt for milling comprising the steps of continuously feeding dry malt to the beginning of a wetting path, continuously mixing and propelling said malt along said wetting path to the end thereof, spraying a predetermined amount of water to said malt as it is mixed and propelled along said wetting path, continuously conducting malt from the end of said wetting path to the beginning of a holding path, said malt being continuously mixed as it is propelled along said wetting path as aforesaid to achieve a uniform wetting of said malt from said spraying of said water continuously propelling said malt along said holding path to the end thereof, and conducting malt from the end of said holding path to a malt mill, the extent of said holding path being adapted to permit said water to uniformly diffuse into the hulls of said malt, the amount of water applied to said malt being adapted to avoid shattering in the hulls.

2. A method of wetting malt as claimed in claim 1, in which said wetting path is substantially horizontal.

3. A method of wetting malt as claimed in claim 2, in which said holding path is substantially horizontal.

4. Apparatus for wetting malt prior to milling, comprising a wetting chamber that defines therein a wetting path for malt, a malt inlet to said wetting chamber adjacent the beginning of said wetting path, a malt outlet from said wetting chamber adjacent the end of said wetting path, means for continuously mixing and propelling malt admitted to said wetting chamber along said wetting path, means for admitting a predetermined amount of moisture to said wetting chamber to wet malt as it moves along said wetting path, a holding chamber having an inlet communicating with said outlet of said wetting chamber, said holding chamber having an outlet, said holding chamber defining a holding path between its said inlet and outlet, and means for continuously propelling malt along said holding path at a predetermined rate whereby malt travels said holding path in a predetermined time.

5. Apparatus for wetting malt prior to milling as claimed in claim 4, in which said wetting path is substantially horizontal.

6. Apparatus for wetting malt prior to milling as claimed in claim 5, in which said holding path is substantially horizontal.

References Cited

UNITED STATES PATENTS 1,258,076   3/1918   Wollner _____ 241—8

FOREIGN PATENTS 512,380   9/1939   Great Britain.

GERALD A. DOST, *Primary Examiner.*